May 16, 1961 P. LAUPER 2,984,767
APPARATUS FOR PREVENTING SELF-EXCITATION OF
CAPACITIVELY LOADED SYNCHRONOUS MACHINES
Filed Dec. 6, 1957 2 Sheets-Sheet 1

INVENTOR:
PAUL LAUPER
BY Leon M. Strauss
AGT.

United States Patent Office 2,984,767
Patented May 16, 1961

2,984,767

APPARATUS FOR PREVENTING SELF-EXCITATION OF CAPACITIVELY LOADED SYNCHRONOUS MACHINES

Paul Lauper, Zurich, Switzerland, assignor to Oerlikon Engineering Company, Zurich, Switzerland, a corporation of Switzerland Filed Dec. 6, 1957, Ser. No. 700,998

Claims priority, application Switzerland Dec. 12, 1956

4 Claims. (Cl. 317—13)

This invention relates to an apparatus for preventing self-excitation of capacitively loaded synchronous machines, using relays.

In order to enable an explanation to be given of the conditions obtaining in a capacitively loaded synchronous machine, the conception of synchronous reactance will first be explained with reference to Figure 1 of the accompanying drawings. In this the pole wheel is denoted by 1, a phase winding of the stator by 2, the longitudinal axis of the rotor by $d$, the transverse axis by $q$ and the angle between the winding axis and the longitudinal axis of the rotor by $\vartheta$. When the stator phase 2 is excited by an alternating current, the reactances obtained for different positions of the pole wheel can be easily determined.

Figure 2 shows the curve of this reactance as a function of the angle $\vartheta$. It will be seen that for $\vartheta=0$ there is the maximum value $x_d$. This may be accounted for because the magnetic conductance is greatest when the longitudinal axis $d$ coincides with the winding axis. The smallest permeance and hence the smallest reactance $x_q$ occur at $\vartheta=90°$. For machines having salient poles, the valid guiding value is that $x_q$ is approximately $0.6 x_q$, and for full-pole machines that $x_q$ is approximately $0.9 x_d$ (compare the curves 3 and 4 of Figure 2). Now if a synchronous machine operates into a cable system or a long line working without load, the capacitive load is considerable.

In order to obtain a constant voltage it is then necessary to reduce the excitation in relation to the non-load excitation. As long as the capacitive load reactance $x_c$ is greater than the longitudinal reactance $x_d$ of the synchronous machine, that is for example equal to $x_{c1}$ (Figure 2), stable operation with positive excitation is possible. For $x_{c2}=x_d$ the excitation is equal to 0, and it becomes negative for still smaller values of $x_c$, that is for those lying between $x_d$ and $x_c$ (for example $x_{c3}$). In this case too, it is still possible to maintain a stable operation with the aid of additional devices for the normal voltage regulator. However, as soon as $x_c$ reaches approximately the value of $x_q$, the voltage is unstable, and self-excitation occurs which causes a dangerous voltage rise.

In order to prevent the voltage rise resulting from self-excitation, it is possible to separate the machine from the supply network in known manner with the aid of excess voltage relays and to effect a rapid de-excitation. The disadvantage of this is that the voltage rises up to to the response value of the relay and the disconnection is relatively difficult in consequence of the voltage rise.

Moreover, it has also already been proposed to measure the delivered capacitive reactive power and to disconnect the load when the permissible limit value of this power is exceeded but this will not dependably prevent self-excitation. If, in fact, the frequency rises, for example, in consequence of a load shedding, the synchronous reactances $x_d$ and $x_q$ of the generator likewise rises. The permissible value of $x_c$ thus also rises, however, so that the permissible reactive power drops at constant voltage. Accordingly self-excitation can occur before the established limit value of the delivered reactive power is reached.

The aforedescribed known disadvantage can be obviated according to the invention, by providing current and voltage transformers which excite a relay in such manner that the switching position of said relay is determined by the value of the ratio between the capacitive reactance of the load and the inductive reactance of the machines, the relay releasing switching operations when the ratio value of the reactances falls below a predetermined value. The advantage of the invention is that the apparatus works faultlessly even in the case of varied frequency and voltage and dangerous voltage rises cannot occur. Moreover, there is a possibility of continuing without interruption, to feed loads which do not contribute to the self-excitation, because de-excitation of the machine does not take place.

While Figures 1 and 2 of the accompanying drawings illustrate the state of the art, Figures 3 to 5 illustrate by way of example embodiments of the present invention.

Figure 1:
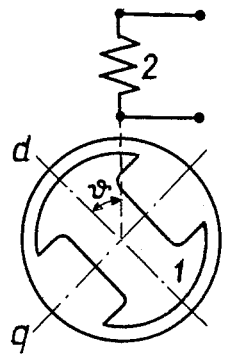
Figure 2:
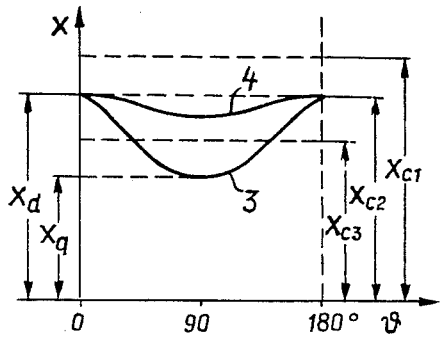
Figure 3:
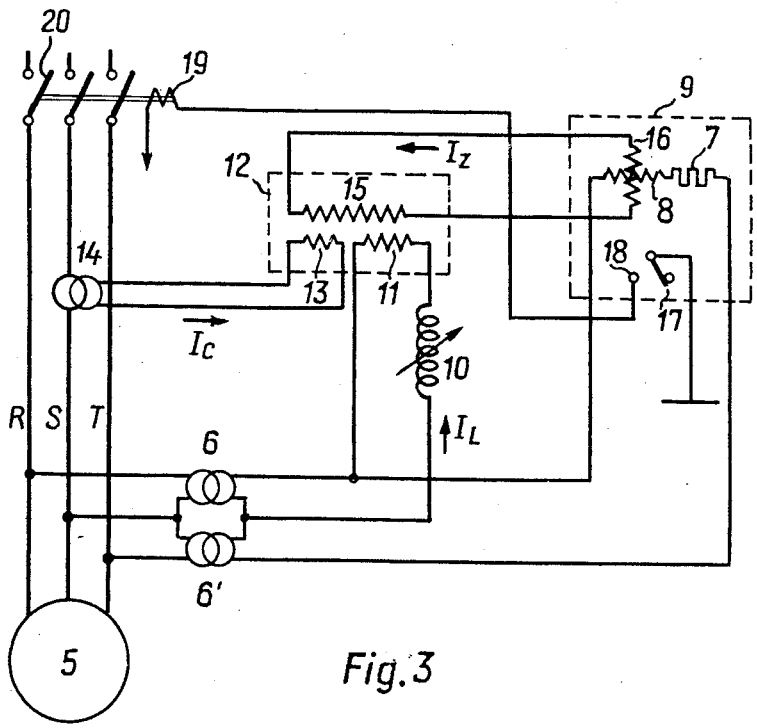
Figure 3 illustrates a reactance arrangement for preventing self-excitation of a synchronous machine.

In the embodiment shown in Figure 3, the primary winding of a voltage transformer 6 is connected to the phases R and S of a synchronous machine 5, and the primary winding of a further voltage transformer 6' to the phases S and T. The secondary windings of these two transformers are connected in series and, through a resistance 7, feed the voltage coil 8 of a wattmetric relay 9. Also connected to the secondary winding of the voltage transformer 6 is a choke coil 10 and in series therewith the primary winding 11 of an intermediate current transformer 12, which has a second primary winding 13 excited by a current transformer 14 lying in the phase S. The secondary winding 15 of the intermediate current transformer 12 is connected to the current coil 16 of the relay 9. This relay has a blank contact 17 and an operating contact 18 which is disposed in the circuit of the control coil 19 of the switch 20.

Figure 4:
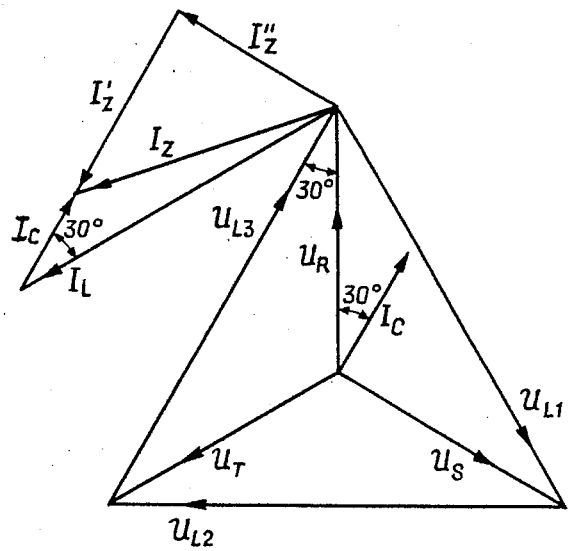
Figure 4 is a vector diagram.

Figure 4 serves to explain the mode of operation of the apparatus of the invention. In this figure, the phase voltages phase-shifted by 120° relative to one another are denoted by $U_R$, $U_S$ and $U_T$. $U_{L1}$; $U_{L2}$ and $U_{L3}$ represent the interlinked line voltages. As will be seen from Figure 3, the secondary voltage of the transformer 6 corresponds to the line voltage $U_{L1}$, and the current $I_L$ must lag by 90° after this voltage, since the load is practically inductive. It will further be clear that in the case of capacitive loading of the synchronous machine, the current $I_C$ must have a leading phase shift of 90° in relation to the voltage $U_S$. From the angles shown in Figure 4 it further follows that $I_C$ runs parallel to $U_{L3}$. Taking into account the circulation relationship obtaining for the intermediate current transformer 12, the current $I_Z$ is obtained as the geometric sum of the currents $I_L$ and $I_C$. If by way of simplification we consider the torque ratios of the relay relative to the voltage $U_{L3}$ and the current $I_Z$, then it follows from the law of energy that the current component $I'_Z$ cannot develop a moment. Only the active component $I'_Z$ is decisive for this. Now as long as $I'_Z$ is in phase opposition to $U_{L3}$, that is as long as $I_C$ is smaller than $I_L \cos 30°$, the relay 9 remains switched to the blank contact. However as soon as $I'_Z$ has the same phase position as $U_{L3}$, the relay switches to the contact 18 so that the switch 20 is tripped and the capacitive load disconnected. Instead of this disconnection, prevention of self-excitation can also be effected by connecting compensation choke coils. From the foregoing it follows that the relay responds only when there is a predetermined ratio between the currents $I_C$ and $I_L$. Since $I_C$ depends on the capacitive reactants $x_C$ and $I_L$ on the inductive reactance $x_L$, the switching processes entailed by the relay are clearly determined by the ratio between $x_C$ and $x_L$. $x_L$ copies as it were, the reactances of the synchronous machine and the apparatus of the invention therefore operates perfectly even in the case of varied frequency and voltage. Finally, by appropriate selection of the value of $x_L$ the possibility is obtained of adapting the ratio values of the reactances to particular requirements.

Figure 5:
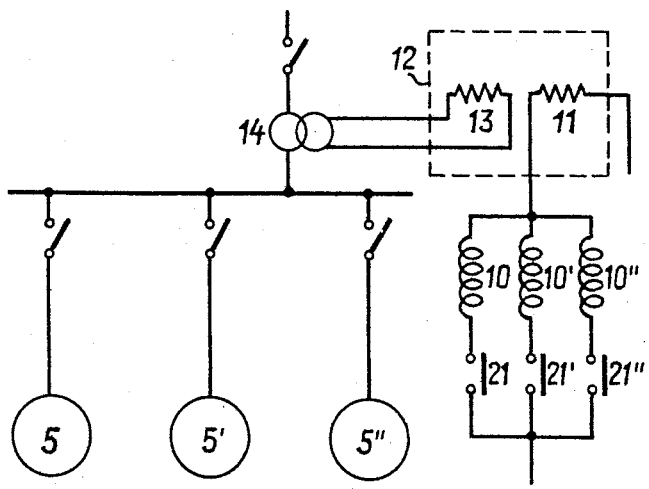
Figure 5 shows a further arrangement for protection against self-excitation.

Figure 5 shows three parallel-connected synchronous machines 5, 5', and 5", which are protected against self-excitation by the hereindescribed apparatus of which only part is illustrated. Like parts are in Figure 5 again have the same references as those in Figure 3. Since in the case of a plurality of machines connected in parallel the permissible capacitive reactance decreases, the response value of the relay must be automatically adapted to the operating conditions. This is effected by means of the contacts 21, 21' and 21", which connect or disconnect corresponding choke coils 10, 10' and 10". If there are also transformers in front of the current transformer 14, they may be copied in similar manner.

In the case of capacitive load, the synchronous machines are normally not saturated. If, however, their voltage is higher than the nominal value, it might in some cases be necessary to take the saturation into account as well. This is easily achieved by appropriate dimensioning of the copy coils. The simulation is effected for example by two series-connected chokes, one choke being unsaturated and corresponding to the stray reactance of the machine, while the other has a saturation characteristic. By appropriate balancing, the ratios obtaining for the desired response value can be correctly ascertained.

I claim:

1. An apparatus for preventing self-excitation of a capacitively loaded synchronous machine comprising a switch controlling operation of said machine, a wattmetric relay having a voltage coil and a current coil and controlling said switch, a resistance, a pair of voltage transformers provided for exciting said relay so that the switching position of said relay is determined by the value of the ratio between the capacitive reactance of the load and the inductive reactance of the machine, said pair of voltage transformers having their secondary windings connected in series connection with each other, said secondary windings being connected through said resistance to said voltage coil, an intermediate current transformer having a first primary winding connected in series with one of said secondary windings, a current transformer, said intermediate current transformer having a second primary winding excited by said current transformer, said intermediate current transformer having its secondary winding connected to said current coil of said wattmetric relay, said relay being actuated to open said switch when the ratio value of the reactances falls below a determined value to thereby prevent self-excitation, the primary windings of said voltage transformers being connected in series forming three terminals of a series circuit, three lines of a three-phase system being connected to said terminals, the secondary windings of said voltage transformers being also in series, a choke, said one of said secondary windings being additionally connected to said choke, said current transformer having its primary winding lying in one line of said three-phase system.

2. An apparatus as claimed in claim 1, in which said choke comprises a coil adapted to be connected automatically to said one voltage transformer by means of an auxiliary contact in such a manner that the total reactance of the machine in operation is always simulated.

3. An apparatus as claimed in claim 1, in which said choke comprises two series-connected coils, one coil being unsaturated and the other having a saturation characteristic.

4. An apparatus as claimed in claim 1, including compensation chokes, said switch when in open position connecting said compensation chokes to said three phase system.

References Cited in the file of this patent

FOREIGN PATENTS

| | | |
|---|---|---|
| 666,013 | France | Sept. 26, 1929 |
| 668,828 | Germany | Dec. 10, 1938 |
| 898,326 | Germany | Nov. 30, 1953 |